(12) United States Patent
    Ali

(10) Patent No.: US 12,693,858 B2
(45) Date of Patent: Jul. 28, 2026

(54) ARCHITECTURE FOR AI ACCELERATOR PLATFORM

(71) Applicant: OpenAI Opco, LLC, San Francisco, CA (US)

(72) Inventor: Nawab Ali, Bellingham, WA (US)

(73) Assignee: Open AI Opco, LLC, San Francisco, CA (US)

( * ) Notice: Subject to any disclaimer, the term of this patent is extended or adjusted under 35 U.S.C. 154(b) by 0 days.

(21) Appl. No.: 18/630,907

(22) Filed: Apr. 9, 2024

(65) Prior Publication Data

US 2024/0403043 A1      Dec. 5, 2024

Related U.S. Application Data

(60) Provisional application No. 63/471,177, filed on Jun. 5, 2023.

(51) Int. Cl.
| | |
|---|---|
| *G06F 15/80* | (2006.01) |
| *G06F 9/30* | (2018.01) |
| *G06F 9/38* | (2018.01) |
| *G06F 13/28* | (2006.01) |

(52) U.S. Cl.
    CPC .......... *G06F 9/3001* (2013.01); *G06F 9/3887* (2013.01); *G06F 13/28* (2013.01)

(58) Field of Classification Search
    CPC ....... G06F 9/3001; G06F 9/3887; G06F 13/28
    See application file for complete search history.

(56) References Cited

U.S. PATENT DOCUMENTS

| | | | | |
|---|---|---|---|---|
| 11,347,477 B2 * | 5/2022 | Sumbul | ............... | G06F 12/0246 |
| 11,475,300 B2 | 10/2022 | Yao | | |

| | | | |
|---|---|---|---|
| 2009/0177867 A1 | 7/2009 | Garde | |
| 2010/0174883 A1 | 7/2010 | Lerner | |
| 2015/0106311 A1 | 4/2015 | Birdwell | |
| 2018/0189631 A1 | 7/2018 | Sumbul | |
| 2019/0102170 A1 | 4/2019 | Chen | |
| 2019/0102359 A1 | 4/2019 | Knag | |
| 2019/0179795 A1 | 6/2019 | Huang | |
| 2019/0205741 A1 | 7/2019 | Gupta | |
| 2019/0340486 A1 | 11/2019 | Mills | |
| 2019/0348110 A1 | 11/2019 | Sinangil | |

(Continued)

FOREIGN PATENT DOCUMENTS

| | | |
|---|---|---|
| WO | 2020190776 | 9/2020 |
| WO | 2022029026 | 2/2022 |

OTHER PUBLICATIONS

Hongwu Jiang, Compute-In-Memory Architecture, 2023, Springer, pp. 1-40. (Year: 2023).*

(Continued)

*Primary Examiner* — Cheng Yuan Tseng

(74) *Attorney, Agent, or Firm* — FINNEGAN, HENDERSON, FARABOW, GARRETT & DUNNER LLP

(57) ABSTRACT

A compute tile is described. The compute tile includes a plurality of compute engines and a general-purpose (GP) processor. Each compute engine includes a compute-in-memory (CIM) hardware module. The CIM hardware module stores plurality of weights corresponding to a matrix and is configured to perform a vector-matrix multiplication (VMM) for the matrix. The GP processor is coupled with the compute engines and is configured to provide control instructions and data to the compute engines.

20 Claims, 8 Drawing Sheets

(56) References Cited

U.S. PATENT DOCUMENTS

| | | | |
|---|---|---|---|
| 2019/0362227 A1 | 11/2019 | Seshadri | |
| 2020/0057938 A1 | 2/2020 | Lu | |
| 2020/0207656 A1* | 7/2020 | Yoshioka | B24B 7/241 |
| 2020/0293284 A1 | 9/2020 | Vantrease | |
| 2020/0320403 A1 | 10/2020 | Daga | |
| 2020/0410337 A1 | 12/2020 | Huang | |
| 2021/0097431 A1 | 4/2021 | Olgiati | |
| 2021/0158132 A1 | 5/2021 | Huynh | |
| 2021/0224185 A1 | 7/2021 | Zhou | |
| 2021/0343343 A1 | 11/2021 | Teague | |
| 2022/0004497 A1 | 1/2022 | Willcock | |
| 2022/0019880 A1 | 1/2022 | Dasgupta | |
| 2022/0114270 A1 | 4/2022 | Wang | |
| 2022/0138286 A1 | 5/2022 | Zage | |
| 2022/0164916 A1 | 5/2022 | Nurvitadhi | |
| 2022/0207293 A1 | 6/2022 | Yao | |
| 2022/0207656 A1* | 6/2022 | Yao | G06N 20/10 |
| 2022/0244916 A1 | 8/2022 | Lee | |
| 2022/0301605 A1 | 9/2022 | Mirhaj | |
| 2022/0309328 A1 | 9/2022 | Saxena | |
| 2022/0318610 A1* | 10/2022 | Seo | G06N 3/063 |
| 2022/0414432 A1 | 12/2022 | Banitalebi Dehkordi | |
| 2022/0414443 A1* | 12/2022 | Li | G06J 1/005 |
| 2023/0014565 A1 | 1/2023 | Ray | |
| 2023/0045840 A1 | 2/2023 | Chih | |
| 2023/0047364 A1 | 2/2023 | Badaroglu | |
| 2023/0074229 A1 | 3/2023 | Jia | |
| 2023/0138695 A1 | 5/2023 | Kumar | |
| 2023/0146647 A1 | 5/2023 | Byeon | |
| 2023/0206044 A1 | 6/2023 | Ma | |
| 2023/0244901 A1* | 8/2023 | Trivedi | G11C 29/028 706/15 |
| 2023/0259456 A1 | 8/2023 | Verma | |
| 2023/0297580 A1 | 9/2023 | Sheng | |
| 2023/0316060 A1 | 10/2023 | Jain | |
| 2023/0359894 A1* | 11/2023 | Kim | G06N 3/0895 |
| 2024/0094986 A1 | 3/2024 | Lyubomirsky | |
| 2024/0134606 A1 | 4/2024 | Yi | |
| 2024/0169201 A1 | 5/2024 | Seok | |

OTHER PUBLICATIONS

Kim et al., MONETA: A Processing-In-Memory-Based Hardware Platform for the Hybrid Convolutional Spiking Neural Network with Online Learning, Frontiers in Neuroscience, vol. 16, Apr. 11, 2022.

Song et al., PipeLayer: A Pipelined ReRAM-Based Accelerator for Deep Learning, 2017.

Korthikanti et al., Reducing Activation Recomputation in Large Transformer Models, May 10, 2022, pp. 1-17.

Lee et al., A 12nm 121-TOPS/W 41.6-TOPS/mm2 All Digital Full Precision SRAM-based Compute-in-Memory with Configurable Bit-width for AI Edge Applications, 2022 Symposium on VLSI Technology & Circuits Digest of Technical Papers, pp. 24-25.

Lin et al., A Novel Voltage-Accumulation Vector-Matrix Multiplication Architecture using Resistor-Shunted Floating Gate Flash Memory Device for Low-Power and High-Density Neural Network Applications, 2018 IEEE International. Electron Devices Meeting (IEDM), Dec. 5, 2018, 4 pages.

Chih et al., 16.4 An 89TOPS/W and 16.3TOPS/mm2 All-Digital SRAM-Based Full-Precision Compute-In Memory Macro in 22nm for Machine-Learning Edge Applications, In Proc. IEEE Int. Solid-State Circuits Conf.(ISSCC), vol. 64, 2021, pp. 252-254.

Li et al., A Precision-Scalable Energy-Efficient Bit-Split-and-Combination Vector Systolic Accelerator for NAS-Optimized DNNs on Edge, 2022 Design, Automation & Test in Europe Conference & Exhibition, 2022, pp. 730-735.

Mori et al., A 4nm 6163-TOPS/W/b 4790-TOPS/mm2/b SRAM Based Digital-Computing-in-Memory Macro Supporting Bit-Width Flexibility and Simultaneous MAC and Weight Update, in 2023 IEEE International Solid-State Circuits Conference (ISSCC), Feb. 2023, pp. 132-134.

* cited by examiner

220

200

260  Compute Tile

Compute Engine
220-0

240

DMA
270

Compute Engine
220-1

252

212

Compute Engine
220-2

254

214

Compute Engine
220-3

256

GP Processor
(e.g. RISC-V,
ARM, etc.)
210

Memory
(e.g.
SRAM)
230

Compute Engine
220-4

250

Compute Engine
220-5

Mesh
Stop
280

1000

1002

Optionally Store Weights in Compute Engine(s)

1004

Provide Input Vector (Activation) to Compute Engine(s)

1006

Perform Vector Matrix Multiplication Using Compute-in-Memory Module

1008

Apply Activation Function(s) to Output

1010

Repeat 1004, 1006, 1008

ARCHITECTURE FOR AI ACCELERATOR PLATFORM

CROSS REFERENCE TO OTHER APPLICATIONS

This application claims priority to U.S. Provisional Patent Application No. 63/471,177 entitled ARCHITECTURE FOR AI ACCELERATOR PLATFORM filed Jun. 5, 2023 which is incorporated herein by reference for all purposes.

BACKGROUND OF THE INVENTION

Artificial intelligence (AI), or machine learning, utilizes learning networks (e.g. deep neural networks) loosely inspired by the brain in order to solve problems. Learning networks typically include layers of weights that weight signals (mimicking synapses) interleaved with activation layers that apply activation functions to the signals (mimicking neurons). Thus, a weight layer provides weighted input signals to an activation layer. Neurons in the activation layer operate on the weighted input signals by applying some activation function to the input signals and provide output signals corresponding to the statuses of the neurons. The output signals from the activation layer are provided as input signals to the next weight layer, if any. This process may be repeated for the layers of the network. Learning networks are thus able to reduce complex problems to a set of weights and the applied activation functions. The structure of the network (e.g., number of layers, connectivity among the layers, dimensionality of the layers, the type of activation function, etc.) are together known as a model. Learning networks can leverage hardware, such as graphics processing units (GPUs) and/or AI accelerators, which perform operations usable in machine learning in parallel. Such tools can dramatically improve the speed and efficiency with which data-heavy and other tasks can be accomplished by the learning network.

In order to be used in data-heavy tasks and/or other applications, the learning network is trained prior to its use in an application. Training involves optimizing a configuration of the high-dimensional and nonlinear set of weights. In other words, the weights in each layer are determined, thereby identifying the parameters of a model. Supervised training may include evaluating the final output signals of the last layer of the learning network based on a set of target outputs (e.g., the desired output signals) for a given set of input signals and adjusting the weights in one or more layers to improve the correlation between the output signals for the learning network and the target outputs. Once the correlation is sufficiently high, training may be considered complete. The model can then be deployed for use. Deploying the model may include copying the weights into a memory (or other storage) of the device on which the model is desired to be used. For example, the weights may be copied into the AI accelerator or storage for the GPU.

Although training can result in a learning network capable of solving challenging problems, determining solutions even with an optimized model may be time-consuming. Use of an AI accelerator may reduce the time required for the machine learning model to provide a solution. However, further improvements are desired. For example, an AI accelerator may only be optimized for general use, rather than for a particular model. As a result, performance of the learning network may be poorer than desired. In addition, a model may be desired to be re-trained for a different purpose and/or a different model may be desired to be used with the same AI accelerator. This may adversely impact efficiency of the AI accelerator and/or require in-situ training as well as inference. Accordingly, what is desired is an improved technique for training and/or using learning networks.

BRIEF DESCRIPTION OF THE DRAWINGS

Various embodiments of the invention are disclosed in the following detailed description and the accompanying drawings.

DETAILED DESCRIPTION

Figure 1:
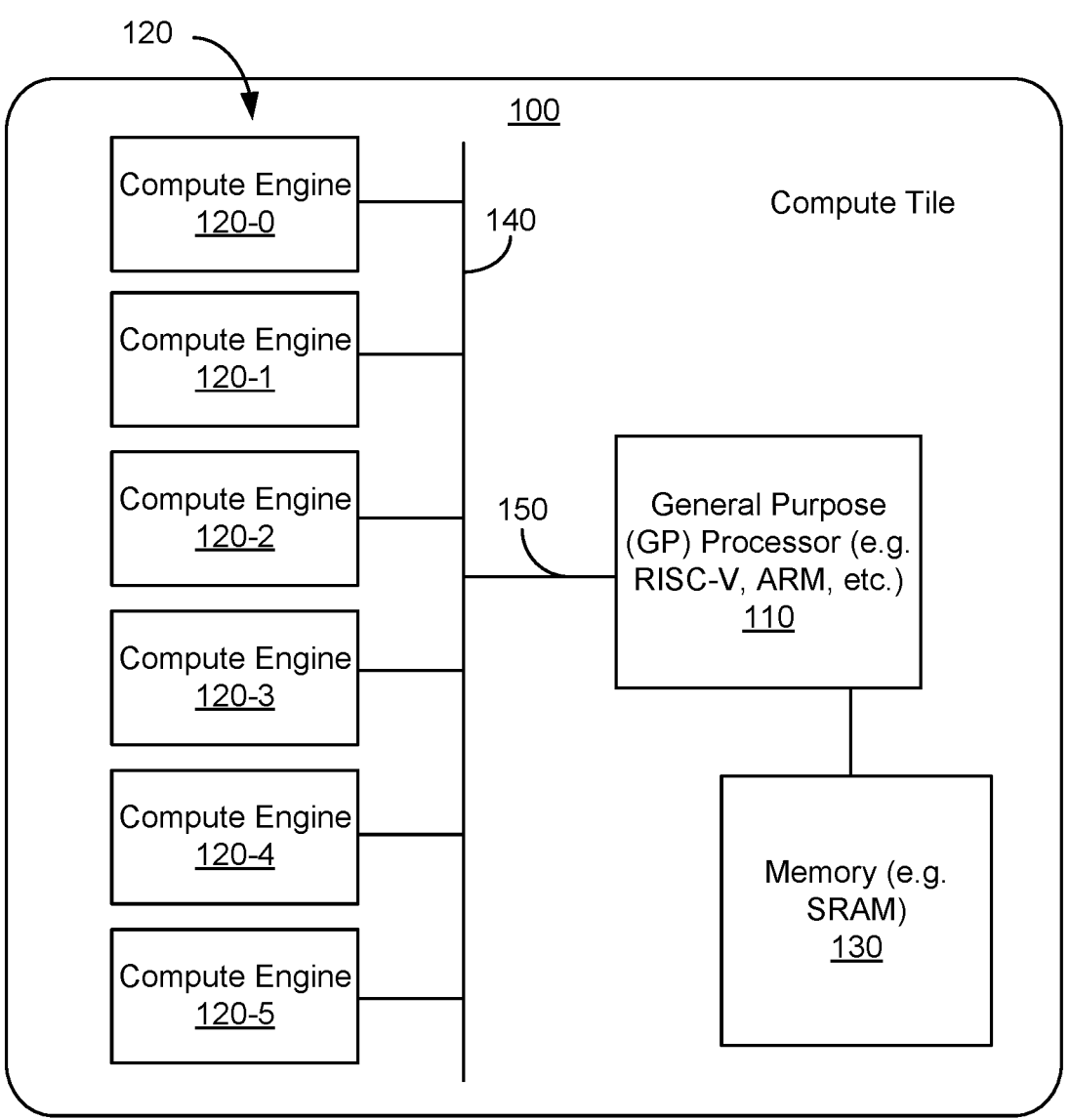
FIG. 1 is a diagram depicting an embodiment of a system usable in an AI accelerator and having an efficient architecture.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A compute tile is described. The compute tile includes a plurality of compute engines and a general-purpose (GP) processor. Each compute engine includes a compute-in-memory (CIM) hardware module. A CIM hardware module performs operations on data stored in memory at (or near) the memory storing the data. The CIM hardware module stores plurality of weights corresponding to a matrix and is configured to perform a vector-matrix multiplication (VMM) for the matrix. The GP processor is coupled with the compute engines and is configured to provide control instructions and data to the compute engines. In some embodiments, the compute tile also includes a local memory and/or a direct memory access (DMA) unit. The local memory is coupled with the GP processor and may be an SRAM. The DMA unit is coupled with the local memory and the GP processor. The DMA unit may be configured for data transfers to and from the compute tile. Each compute engine may further include a local update module coupled with the CIM hardware module. The local update module is configured to update at least a portion of the weights.

A system including multiple compute tiles is described. Each compute tile includes compute engines and a GP processor coupled with the compute engines. Each compute engine includes a CIM hardware module that stores weights corresponding to a matrix and is configured to perform a VMM for the matrix. The GP processor is configured to provide control instructions and data to the plurality of compute engines. The GP processor may be coupled with the compute engines via a streaming port and a control port. The control port provides the compute engines with the control instructions. The streaming port is used to exchange data between the GP processor and the compute engines. The compute engines may be configured to perform linear operations. The GP processor may perform operations including nonlinear operations.

In some embodiments, at least one of the compute tiles further includes local memory coupled with the GP processor. The compute tile(s) may include a DMA unit coupled with the local memory and the GP processor for the compute tile(s). The DMA unit is configured for data transfers to and from the compute tile. The GP processor may also include a single instruction multiple data arithmetic logic unit. In some embodiments, each compute engine also includes a local update module coupled with the CIM hardware module and is configured to update at least a portion of the plurality of weights.

A method is described. The method includes storing, in at least one compute engine, weights corresponding to a matrix. Each of the compute engine(s) includes a compute-in-memory (CIM) hardware module. The CIM hardware module stores the weights and is configured to perform a vector-matrix multiplication (VMM) for the matrix. The method also includes providing, to the compute engine(s), an input vector. The compute engine(s) perform a VMM between the input vector and the matrix. A function is applied, by a general-purpose (GP) processor coupled with the compute engines, to the output. The GP processor is configured to provide control instructions and data to the compute engines.

In some embodiments, the GP processor is coupled with the compute engines via a streaming port and a control port. The control port provides the compute engines with the control instructions and the streaming port exchanges data between the GP processor and the compute engines. The compute engines may perform linear operations, while the GP processor performs operations including nonlinear operations.

FIG. 1 is a diagram depicting an embodiment of system 100 usable in a learning network. System 100 is a compute tile and may be considered to be an artificial intelligence (AI) accelerator having an efficient architecture. Compute tile (or simply "tile") 100 may be implemented as a single integrated circuit. Compute tile 100 includes a general purpose (GP) processor 110 and compute engines 120-0 through 120-5 (collectively or generically compute engines 120). Although six compute engines 120 are shown, in other embodiments another number may be included. GP processor 110 is shown as being coupled with compute engines 120 via compute bus (or other connector) 140, and bus 150. In other embodiments, GP processor 110 may be connected with compute engines 120 in another manner. In some embodiments, compute tile 100 may include on-tile memory 130. In other embodiments, memory 130 may be omitted. Other components, for example a cache or another additional memory, module(s) for applying activation functions, modules for moving data, and/or other modules, may be present in compute tile 100 in some embodiments.

GP processor 110 is a reduced instruction set computer (RISC) processor. For example, GP processor 110 may be a RISC-V processor or ARM processor. In other embodiments, different and/or additional general purpose processor(s) may be used. The GP processor 110 provides control instructions and data to the compute engines 120. GP processor 110 implements instruction set(s) used in controlling compute engines 120. GP processor 110 provides the commands to compute engines 120 and controls data movement to and/or from compute engines 120. GP processor 110 may thus function as part of a control plane (i.e. providing commands and being part of the data path) for compute engines 120 and tile 100.

In some embodiments, data is moved from memory 130 or another source to compute engine(s) 120 through GP processor 110. Data may be sent from memory 130 to internal memory of GP processor 110, and then to the appropriate compute engine(s) 120 via buses 140 and 150. For example, data from memory 130 may be provided to a vector register file (not shown) of GP processor 110 and then provided from GP processor 110 to the appropriate compute engine(s) 120. Once compute engines 120 have performed their functions, the output is provided to GP processor 110. Similarly, data may be moved from compute engines 120 to memory 130 or another destination via GP processor 110. Thus, GP processor 110 may be part of both the control plane and data plane for compute tile 100.

GP processor 110 may also perform other functions. GP processor 110 may apply activation function(s) to data. For example, an activation function (e.g. a ReLu, Tanh, and/or SoftMax) may be applied to the output of compute engine(s) 120. Thus, GP processor 110 may perform nonlinear operations. GP processor 110 may also perform linear functions and/or other operations. However, GP processor 110 is still desired to have reduced functionality as compared to, for example, a graphics processing unit (GPU) or central processing unit (CPU) of a computer system with which tile 100 might be used.

Compute engines 120 are configured to perform, efficiently and in parallel, tasks that may be part of using (e.g. performing inferences) and/or training (e.g. performing inferences and/or updating weights) a model. Compute engines 120 are coupled with and receive commands and, in at least some embodiments, data from GP processor 110.

Compute engines 120 are modules which perform vector-matrix multiplications (VMMs) in parallel. Thus, compute engines 120 may perform linear operations. Each compute engine 120 includes a compute-in-memory (CIM) hardware module (not specifically shown in FIG. 1). The CIM hardware module stores weights corresponding to a matrix and is configured to perform a VMM in parallel for the matrix. Compute engines 120 may also include local update (LU) module(s) (not specifically shown in FIG. 1). Such LU module(s) allow compute engines 120 to update weights stored in the CIM.

The CIM module is a hardware module that stores data and performs operations. In some embodiments, CIM module stores weights for the model. As such, the CIM module determines the maximum size of the model that can be handled by compute tile 100 (i.e. the maximum number of parameters, or weights). The CIM module stores the weights (or other data) in cells that are fully addressable. The CIM module also performs operations using the weights. More specifically, the CIM module performs VMMs, where the vector may be an input vector (e.g. an activation) provided using GP processor 110 and the matrix may be weights (i.e. data/parameters) stored by the CIM module. The CIM module may be considered to include a memory (e.g. that stores the weights) and compute hardware (e.g. that performs the vector-matrix multiplication of the stored weights). In some embodiments, the vector may be a matrix. The CIM module may include an analog SRAM having multiple SRAM cells and configured to provide output(s) (e.g. voltage(s)) corresponding to the data (weight/parameter) stored in each cell of the SRAM multiplied by a corresponding element of the input vector. In some embodiments, the CIM module may include a digital SRAM having multiple SRAM cells and configured to provide output(s) corresponding to the data (weight/parameter) stored in each cell of the digital SRAM multiplied by a corresponding element of the input vector. Other configurations of CIM modules are possible. Each CIM module thus stores weights corresponding to a matrix in its cells and is configured to perform a vector-matrix multiplication of the matrix with an input vector. In some embodiments, the CIM module of a compute engine 120 may be repurposed as memory if the compute engine utilization falls below a particular threshold (e.g. 70%-80%). For example, the CIM might store duplicate weights or vectors (e.g. activations) in such embodiments.

In order to facilitate on-chip learning, local update (LU) modules (not shown) may also be provided in compute engines 120. LU modules are coupled with the corresponding CIM modules. LU modules are used to update the weights (or other data) stored in the CIM modules. LU modules are considered local because LU modules are in proximity to CIM modules. For example, LU module(s) for a particular compute engine 120 may reside in the same integrated circuit as the CIM module(s) for compute engine 120. In some embodiments, the LU module is considered local because it is fabricated on the same substrate (e.g. the same silicon wafer) as the corresponding CIM module. In some embodiments, LU modules are also used in determining the weight updates. In other embodiments, a separate component may calculate the weight updates. For example, in addition to or in lieu of LU modules, the weight updates may be determined by GP processor 110, in software by other processor(s) not part of compute tile 100, by other hardware that is part of compute tile 100, by other hardware outside of compute tile 100, and/or some combination thereof.

Memory 130 may be or include a static random access memory (SRAM) and/or some other type of memory. Memory 130 is shown as coupled with GP processor 110. Stated differently, data movement between memory 130 and compute engines 120 may take place via GP processor 120. In some embodiments, memory 130 may be coupled to compute bus 140 (i.e. to compute engines 120). Memory 130 may store activations (e.g. input vectors provided to compute tile 100 and the resultant of activation functions applied to the output of compute engines 120). Memory 130 may also store weights. For example, memory 130 may contain a backup copy of the weights or different weights if the weights stored in compute engines 120 are desired to be changed. In some embodiments, memory 130 is organized into banks of cells (e.g. banks of SRAM cells). In such embodiments, specific banks of memory 130 may service specific one(s) of compute engines 120. In other embodiments, banks of memory 130 may service any compute engine 120.

In operation, an input vector is provided to one or more of compute engines 120 by GP processor 110. The input vector is desired to be multiplied by the weights, which may have been previously stored in compute engine(s) 120. An input vector may be provided to multiple compute engines 120 if the weight matrix and/or input vector have too many elements for a single compute engine. In some such embodiments, a portion of the input vector is provided to each of the multiple compute engines 120 (each of which stores a portion of the weights). In some embodiments, the input vector is provided from memory 130 to GP processor 110 and from GP processor 110 to compute engine(s) 120. GP processor 110 also instructs compute engine(s) 120 to perform a VMM. Compute engine(s) 120 perform a VMM between the input vector and the matrix of weights to provide an output. The VMM is performed in parallel for the elements of the input vector. The output of compute engine(s) 120 may be considered an output vector. The output is provided by compute engine(s) 120 to GP processor 110. For example, the output may be stored in a vector register file of GP processor 110. GP processor 110 may also store the output (e.g. in memory 130) and/or may provide the output to another component off-tile. GP processor 110 may apply a function (e.g. an activation function) to the output. The of results of the activation function applied to the output of compute engines 120 may be stored in GP processor 110 (e.g. in a buffer or the vector register file). GP processor 110 may also store the results in memory 130 or off-tile. GP processor 110 may provide the results as an input vector to other compute engine(s) 120 to apply a different set of weights to the results where another set of weights are stored in other compute engine(s) 120. Thus, one or more inferences with one or more distinct sets of weights may be performed. In some embodiments, training may also be performed by tile 100. In some such embodiments, GP processor 110 or another component (such as a host) may determine the desired update for the weights. In some embodiments, LU module (not shown) of compute engines 120 may be used to determine and apply the updates to the weights.

Thus, compute tile 100 includes two compute blocks, GP processor 110 and compute engines 120, which work together. GP processor 110 may perform nonlinear operations (e.g. activation functions) and compute engines perform 120 may perform linear operations (e.g. VMMs). GP processor 110 is in the control and data planes for compute engines 120. GP processor 110 and compute engines 120 are, therefore, tightly coupled. Consequently, data may be moved more efficiently within tile 100. Operations, such as VMMs and the application of activation functions to the output of compute engines 120, may be more efficiently performed. Further, a special purpose controller need not be designed and fabricated for compute tile 100. Instead, GP processor 110 is used. As a result, compute tile 100 may be more flexible and more readily designed and fabricated. For example, the activation applied by GP processor 110 may be updated by updating GP processor 110. A new special purpose controller need not be provided. Consequently, functions for machine learning may be more efficiently and readily performed. In addition, compute tile 100 includes on-tile memory 130. Use of on-tile memory, for example as a scratchpad memory, allows for a high degree of independence of compute tile 100 from other components (e.g. other tiles). Thus, multiple tiles 100 may more readily work in parallel. Consequently, efficiency of learning may be enhanced.

Figure 2:
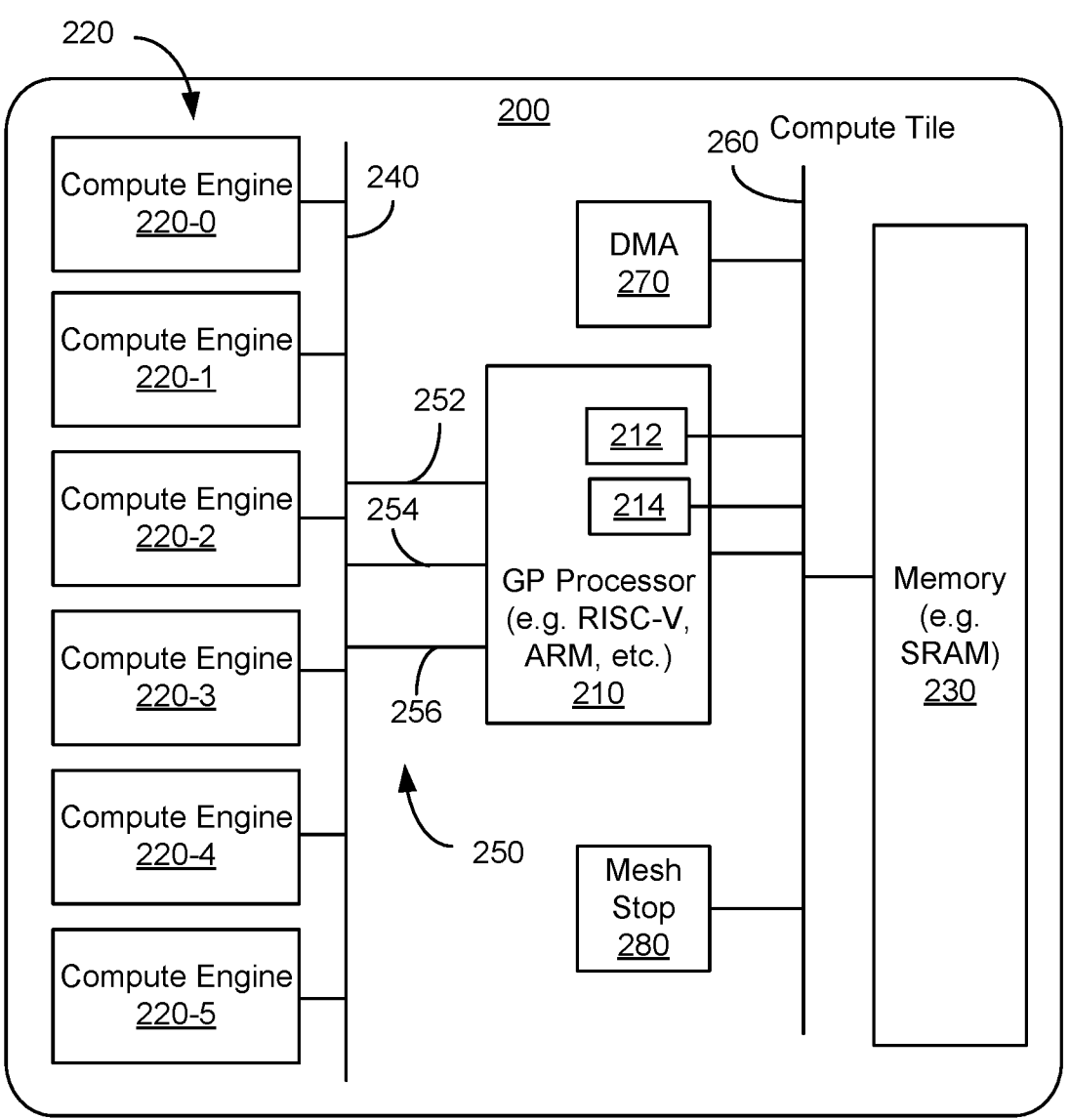
FIG. 2 depicts an embodiment of a system usable in an AI accelerator and having an efficient architecture.

FIG. 2 is a diagram depicting an embodiment of compute tile 200 usable in a learning network. Compute tile 200 that may be an AI accelerator having an efficient architecture. Compute tile 200 is analogous to compute tile 100. Compute tile 200 thus includes GP processor 210 and compute engines 220-0 through 220-5 (collectively or generically compute engines 220) analogous to GP processor 110 and compute engines 110-0 through 110-5, respectively. Although six compute engines 210 are shown, in other embodiments another number may be included. GP processor 210 is shown as being coupled with compute engines 220 via compute bus (or other connector) 240, and bus 250. In other embodiments, GP processor 210 may be connected with compute engines 220 in another manner. Compute tile 200 may include on-tile memory 230 that is analogous to on-tile memory 130. Memory 230 may thus be or include SRAM. Data movement between memory 230 and compute engines 220 may take place via GP processor 220. In some embodiments, memory 230 may be coupled to compute bus 240 (i.e. to compute engines 220). In the embodiment shown, compute tile 200 also includes bus 260, direct memory access (DMA) module 270, and mesh stop 280.

GP processor 210 is analogous to GP processor 110. Thus, GP processor 210 may be a RISC-V processor or ARM processor. In other embodiments, different and/or additional general purpose processor(s) may be used. The GP processor 210 provides control instructions and manages data flow for the compute engines 220. Data sent to or from compute engines 220 may also pass through GP processor 210. Thus, GP processor 210 may be part of both the control plane and data plane for compute tile 200. GP processor 210 may also perform other functions, including nonlinear functions. For example, GP processor 210 may apply activation function(s) to data. In some embodiments, GP processor 210 may include a vector processing unit (not shown) that executes nonlinear operations (e.g. applying activation functions to data). Also explicitly shown as part of GP processor 210 are local memories 212 and 214. In some embodiments, local memory 212 stores instructions while local memory 214 stores data.

Compute engines 220 are analogous to compute engines 120. Compute engines 220 are configured to perform, efficiently and in parallel, tasks that may be part of using and/or training a model. Compute engines 220 are coupled with and receive commands and, in at least some embodiments, data from GP processor 210. Compute engines 220 perform linear operations such as VMMs in parallel. Each compute engine 220 includes a CIM hardware module (not specifically shown in FIG. 2) analogous to that described for compute engines 120. The CIM hardware module stores weights corresponding to a matrix and is configured to perform a VMM for the matrix. Compute engines 220 may also include LU module(s) (not specifically shown in FIG. 2).

Bus 250 couples GP processor 210 with compute bus 240 and, therefore, with compute engines 220. Compute bus 250 includes control bus 252, streaming bus 254, and status bus 256. Control bus 252, streaming bus 254, and status bus 256 are coupled with a control port (not explicitly labeled), a streaming port (not explicitly labeled), and a status port (not explicitly labeled), respectively, of GP processor 210. Control bus 252 receives instructions for compute engines 220 from GP processor 210. Compute engines 220 perform operations based on the instructions. For example, the instructions may include a load instruction to load data from GP processor 210 to identified compute engine(s) 220, a store instruction to store data from identified compute engine(s) 220 to GP processor 210, and supporting instructions that identify the addresses in identified compute engine(s) 220 to which data is to be loaded and from which data is to be read. Streaming bus 254 may be a high speed, high bandwidth bus. In some embodiments, streaming bus 254 is 512 bits wide. Other bus widths are possible. Streaming bus 254 is used to rapidly move data between GP processor 210 and compute engines 220. Status bus may allow for reading from or writing to a status register for a compute engine 220. Thus, GP processor 210 may be informed of the particular compute engine 220 completing a task, such as a VMM.

Compute tile 200 also includes DMA 270 and mesh stop 280. DMA 270 initiates data movement for compute tile 200. DMA 270 may be used to move data from off-tile to on-tile and vice-versa. Thus, DMA 270 may be used to communicate with a host (not shown) and/or other tiles (not shown in FIG. 2). For example, DMA 270 may be used to move input vectors (activations) from the host or another tile (not shown in FIG. 2) to memory 230. If memory 230 is also directly connected to compute engines 220 (e.g. via compute bus 240), then DMA 270 may be used to move data between memory 230 and compute engines 220. Mesh stop 280 provides an interface between compute tile 200 and the fabric of a mesh network that includes compute tile 200. Thus, mesh stop 280 may be used to communicate with other compute tiles (not shown) with which compute tile 200 may be used. Data may also be moved via bus 260. In some embodiments, therefore, data may be moved to and/or from memory 230 as well as to and/or from tile 200 via buses such as bus 240, 250, and/or 260.

Compute tile 200 functions in an analogous manner to compute tile 100. For example, data may be transferred on-tile from a host or other tile via DMA 270 and/or mesh stop 280. Such data may be stored in memory 230. Thus, memory 230 may store weights and input vectors. The weights may be loaded in one or more compute engines 220 for use. For example, the weights may be moved from memory 230 to the CIM hardware module(s) of compute engine(s) 220 via GP processor 210. For an inference, an input vector is provided to one or more of compute engines 220 by GP processor 210. To do so, the input vector/activation may be moved from memory 230 to GP processor 210 and from GP processor 210 to compute engine(s) 220 via streaming bus 254. Compute engine(s) 220 perform a VMM in parallel of the elements of the input vector and the matrix (or matrices) of weights stored in compute engine(s) 220. The output of compute engine(s) 220 may be stored from compute engine(s) 220 to GP processor 210 via streaming bus 254. GP processor 210 may apply a function (e.g. an activation function) to the output. The resultant of the activation function applied to the output of compute engines 220 may be stored in GP processor 210 (e.g. a buffer, which is not explicitly shown in FIG. 2). GP processor 210 may also store the resultant in memory 230. GP processor 210 may provide the resultant to another tile or the host via mesh stop 280 or DMA 270. GP processor may provide the resultant as an input vector to other compute engine(s) 220 to apply a different set of weights to the resultant where another set of weights are stored in other compute engine(s). Thus, one or more inferences with one or more distinct sets of weights may be performed. In some embodiments, training may also be performed by tile 200. In some such embodiments, GP processor 210 or another component (such as a host) may determine the desired update for the weights. In some embodiments, LU module (not shown) of compute engines 220 may be used to determine and apply the updates to the weights.

Compute tile 200 may share the benefits of compute tile 100. GP processor 210 and compute engines 220 are compute blocks which work closely together. For example, the data and control planes for compute tile 200 may include memory 230, GP processor 210, buses 240 and 250, and compute engines 220. Consequently, data may be moved more efficiently within tile 200 and operations, such as VMMs and the application of activation functions, may be more efficiently performed. Further, a special purpose controller need not be designed and fabricated for compute tile 200. As a result, compute tile 200 may be more flexible and more readily designed and fabricated. Consequently, functions for machine learning may be more efficiently and readily performed. In addition, on-tile memory 230 allows for a high degree of independence of compute tile 200 from other components (e.g. other tiles). Thus, multiple tiles 200 may more readily work in parallel and efficiency may be improved.

Figure 3:
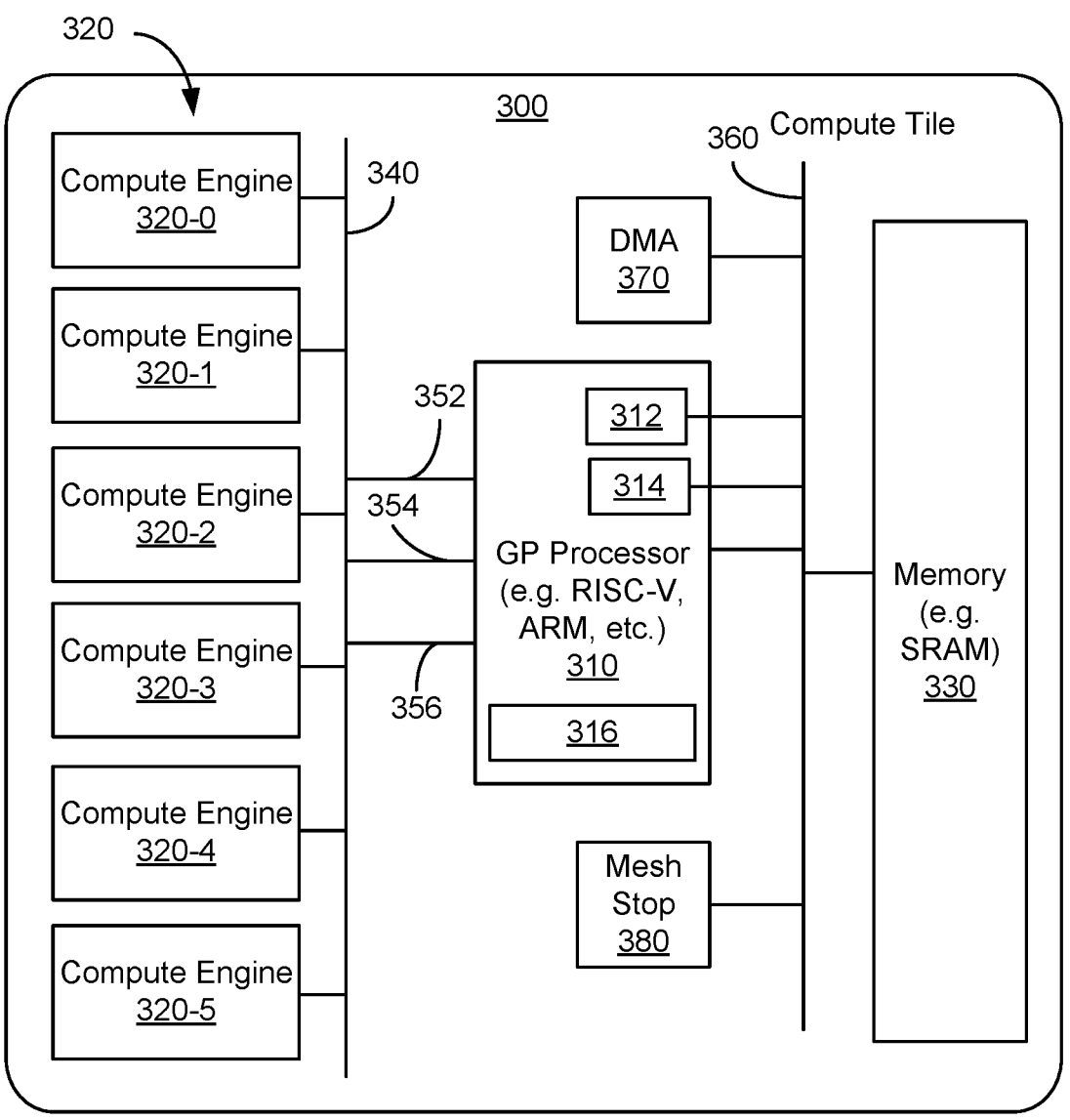
FIG. 3 depicts an embodiment of a system usable in an AI accelerator and having an efficient architecture.

FIG. 3 is a diagram depicting an embodiment of compute tile 300 usable in a learning network. Compute tile 300 that may be an AI accelerator having an efficient architecture. Compute tile 300 is analogous to compute tiles 100 and 200. Compute tile 300 thus includes GP processor 310, compute engines 320-0 through 320-5 (collectively or generically compute engines 320), memory 330, compute bus 340, bus 350, bus 360, DMA 370, and mesh stop 380 that are analogous to GP processors 110/210, compute engines 120/220, memory 130/230, compute bus 140/240, bus 150/250, bus 260, DMA 270, and mesh stop 280, respectively. Although six compute engines 310 are shown, in other embodiments another number may be included. GP processor 310 is shown as being coupled with compute engines 320 via compute bus (or other connector) 340, and bus 350. In other embodiments, GP processor 310 may be connected with compute engines 320 in another manner. GP processor 310 also includes memories 312 and 314 analogous to local memories 212 and 214, respectively. Data movement between memory 330 and compute engines 320 may take place via GP processor 320. For example, bus 350 includes control bus 352, streaming bus 354, and status bus 356 analogous to control bus 252, streaming bus 254, and status bus 256, respectively. In some embodiments, memory 330 may be coupled to compute bus 340 (i.e. to compute engines 320).

GP processor 310 is analogous to GP processors 110 and/or 210. Thus, GP processor 310 may be a RISC-V processor or ARM processor. In other embodiments, different and/or additional general purpose processor(s) may be used. The GP processor 310 provides control instructions and manages dataflow for the compute engines 320. Data sent to or from compute engines 320 may also pass through GP processor 310. Thus, GP processor 310 may be part of both the control plane and data plane for compute tile 300. GP processor 310 may also perform other functions, including nonlinear functions. For example, GP processor 310 may apply activation function(s) to data. In some embodiments, GP processor 310 may include a vector processing unit (not shown) that executes nonlinear operations (e.g. applying activation functions to data).

In addition, GP processor includes an additional fixed function compute block (FFCB) 316. In some embodiments, FFCB 316 is a single instruction multiple data arithmetic logic unit (SIMD ALU). In some embodiments, FFCB 316 may be configured in another manner. FFCB 316 may be a close-coupled fixed-function unit for on-device inference and training of learning networks. In some embodiments, FFCB 316 executes nonlinear operations, number format conversion and/or dynamic scaling. In some embodiments, other and/or additional operations may be performed by FFCB 316. FFCB 316 may be coupled with the data path for the vector processing unit of GP processor 310.

Compute engines 320 are analogous to compute engines 120 and/or 220. Compute engines 320 are configured to perform, efficiently and in parallel, tasks that may be part of using and/or training a model. Compute engines 320 are coupled with and receive commands and, in at least some embodiments, data from GP processor 310. Compute engines 320 perform linear operations such as VMMs in parallel. Each compute engine 320 includes a CIM hardware module (not specifically shown in FIG. 3) analogous to that described for compute engines 120. The CIM hardware module stores weights corresponding to a matrix and is configured to perform a VMM for the matrix. Compute engines 320 may also include LU module(s) (not specifically shown in FIG. 3). In addition, on-tile memory 330 allows for a high degree of independence of compute tile 300 from other components (e.g. other tiles). Thus, multiple tiles 300 may more readily work in parallel.

Figure 4:
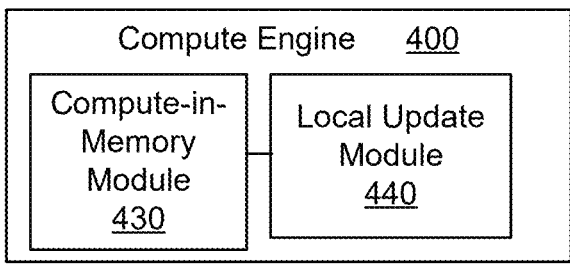
FIG. 4 depicts an embodiment of a portion of a compute engine usable in an AI accelerator.

FIG. 4 depicts compute engine 400 usable in an AI accelerator. Compute engine 400 may be part of an AI accelerator that can be deployed for using a model (not explicitly depicted) and for allowing for on-chip training of the model (otherwise known as on-chip learning). Compute engine 400 may thus be used as compute engine(s) 120, 220, and/or 320. Compute engine 400 includes CIM module 430 and LU module 440. Although one CIM module 430 and one LU module 440 is shown, a compute engine may include another number of CIM modules 430 and/or another number of LU modules 440. For example, a compute engine might include three CIM modules 430 and one LU module 440, one CIM module 430 and two LU modules 440, or two CIM modules 430 and two LU modules 440.

CIM module 430 is a hardware module that stores data and performs operations. In some embodiments, CIM module 430 stores weights for the model. CIM module 430 also performs operations using the weights. More specifically, CIM module 430 performs vector-matrix multiplications, where the vector may be an input vector provided using processor 110 and the matrix may be weights (i.e. data/parameters) stored by CIM module 430. Thus, CIM module 430 may be considered to include a memory (e.g. that stores the weights) and compute hardware (e.g. that performs the vector-matrix multiplication of the stored weights). In some embodiments, the vector may be a matrix (i.e. an n×m vector where n>1 and m>1). For example, CIM module 430 may include an analog static random access memory (SRAM)

having multiple SRAM cells and configured to provide output(s) (e.g. voltage(s)) corresponding to the data (weight/ parameter) stored in each cell of the SRAM multiplied by a corresponding element of the input vector. In some embodiments CIM module 430 may include a digital static SRAM having multiple SRAM cells and configured to provide output(s) corresponding to the data (weight/parameter) stored in each cell of the digital SRAM multiplied by a corresponding element of the input vector. In some embodiments, CIM module 430 may include an analog resistive random access memory (RAM) configured to provide output (e.g. voltage(s)) corresponding to the impedance of each cell multiplied by the corresponding element of the input vector. Other configurations of CIM module 530 are possible. Each CIM module 430 thus stores weights corresponding to a matrix in its cells and is configured to perform a vector-matrix multiplication of the matrix with an input vector.

In order to facilitate on-chip learning, LU module 440 may be provided. LU module 440 is coupled with the corresponding CIM module 430. LU module 440 is used to update the weights (or other data) stored in CIM module 430. LU module 440 is considered local because LU module 440 is in proximity with CIM module 430. For example, LU module 440 may reside on the same integrated circuit as CIM module 430. In some embodiments LU module 440 for a particular compute engine resides in the same integrated circuit as the CIM module 430. In some embodiments, LU module 440 is considered local because it is fabricated on the same substrate (e.g. the same silicon wafer) as the corresponding CIM module 430. In some embodiments, LU module 440 is also used in determining the weight updates. In other embodiments, a separate component may calculate the weight updates. For example, in addition to or in lieu of LU module 440, the weight updates may be determined by a GP processor, in software by other processor(s) not part of compute engine 400 and/or the corresponding AI accelerator (e.g. compute tile 100, 200, or 300), by other hardware that is part of compute engine 400 and/or the corresponding AI accelerator (e.g. compute tile 100, 200, or 300), by other hardware outside of compute engine 400 or the corresponding AI accelerator (e.g. compute tile 100, 200, or 300), and/or some combination thereof.

Using compute engine 400 in the context of compute tiles 100, 200, or 300 and/or an analogous system, efficiency and performance of a learning network may be improved. Use of CIM modules 430 may dramatically reduce the time to perform the vector-matrix multiplication that provides the weighted signal. Thus, performing inference(s) using compute engine 400 may require less time and power. This may improve efficiency of training and use of the model. LU modules 440 allow for local updates to the weights in CIM modules 430. This may reduce the data movement that may otherwise be required for weight updates. Consequently, the time taken for training may be greatly reduced. In some embodiments, the time taken for a weight update using LU modules 440 may be an order of magnitude less (i.e. require one-tenth the time) than if updates are not performed locally. Efficiency and performance of a learning network provided using system 100 may be increased.

Figure 5:
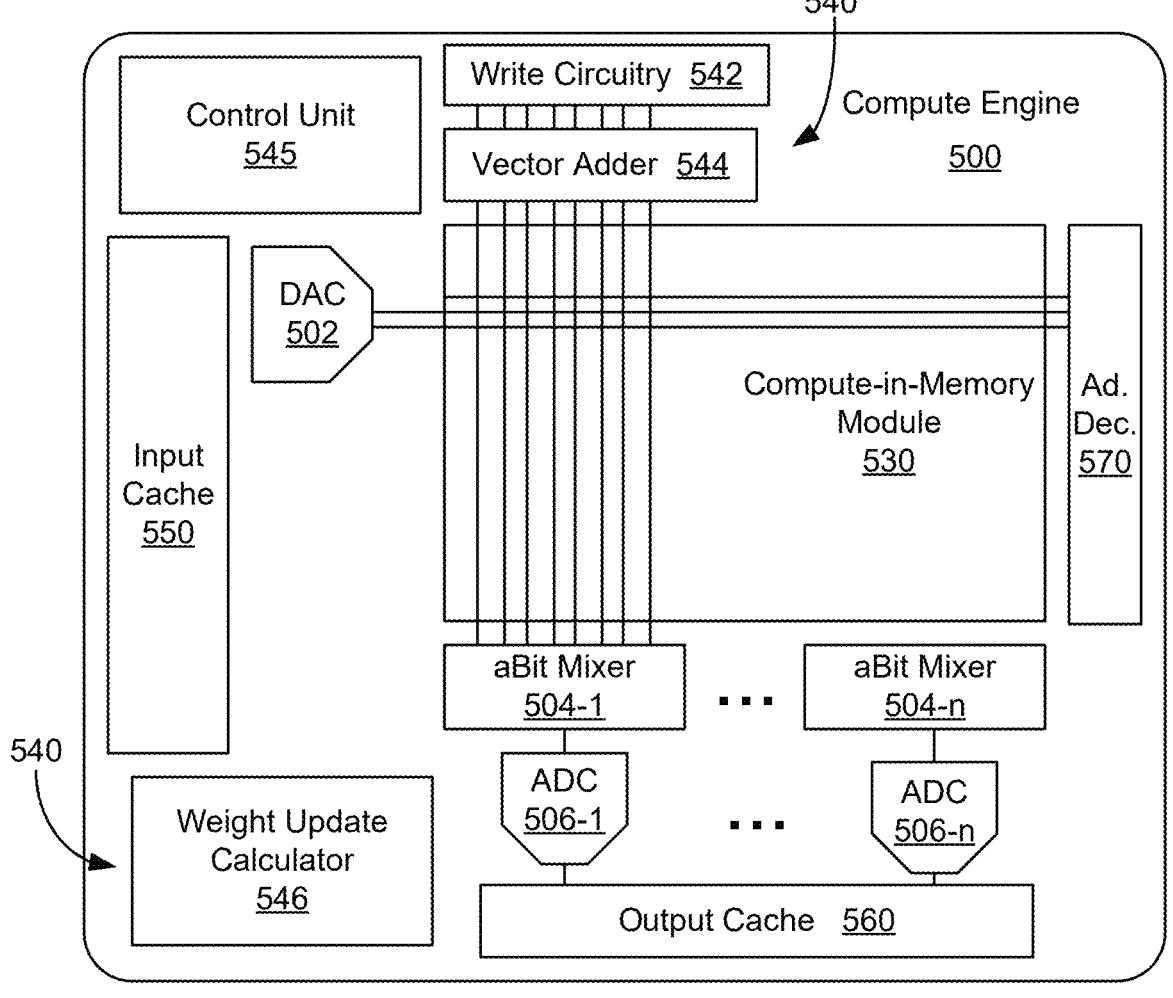
FIG. 5 depicts an embodiment of a portion of a compute engine usable in an AI accelerator and capable of performing local updates.

FIG. 5 depicts an embodiment of compute engine 500 usable in an AI accelerator and capable of performing local updates. Compute engine 500 may be a hardware compute engine analogous to compute engine 400. Compute engine 500 thus includes CIM module 530 and LU module 540 analogous to CIM modules 430 and LU modules 440, respectively. Compute engine 500 also includes analog bit mixer (aBit mixer) 504-1 through 504-n (generically or collectively 504), analog to digital converter(s) (ADC(s)) 506-1 through 506-n (generically or collectively 506), input cache 550, output cache 560, and address decoder 570. Although particular numbers of components 502, 504, 506, 530, 540, 542, 544, 546, 360, and 570 are shown, another number of one or more components 502, 504, 506, 530, 540, 542, 544, 546, 360, and 570 may be present.

CIM module 530 is a hardware module that stores data corresponding to weights and performs vector-matrix multiplications. The vector is an input vector provided to CIM module 530 (e.g. via input cache 550) and the matrix includes the weights stored by CIM module 530. In some embodiments, the vector may be a matrix. Examples of embodiments CIM modules that may be used in CIM module 530 are depicted in FIGS. 6 and 7.

Figure 6:
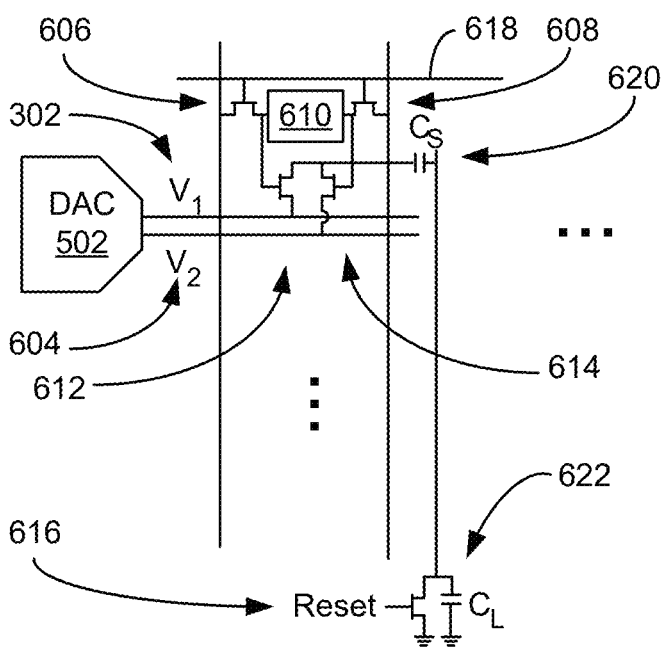
FIG. 6 depicts an embodiment of a portion of a compute-in-memory module usable in an AI accelerator. (SRAM)

FIG. 6 depicts an embodiment of a cell in one embodiment of an SRAM CIM module usable for CIM module 530. Also shown is DAC 502 of compute engine 500. For clarity, only one SRAM cell 610 is shown. However, multiple SRAM cells 610 may be present. For example, multiple SRAM cells 610 may be arranged in a rectangular array. An SRAM cell 610 may store a weight or a part of the weight. The CIM module shown includes lines 602, 604, and 618, transistors 606, 608, 612, 614, and 616, capacitors 620 ($C_S$) and 622 ($C_L$). In the embodiment shown in FIG. 6, DAC 502 converts a digital input voltage to differential voltages, $V_1$ and $V_2$, with zero reference. These voltages are coupled to each cell within the row. DAC 502 is thus used to temporal code differentially. Lines 602 and 604 carry voltages $V_1$ and $V_2$, respectively, from DAC 502. Line 618 is coupled with address decoder 570 (not shown in FIG. 6) and used to select cell 610 (and, in the embodiment shown, the entire row including cell 610), via transistors 606 and 608.

In operation, voltages of capacitors 620 and 622 are set to zero, for example via Reset provided to transistor 616. DAC 502 provides the differential voltages on lines 602 and 604, and the address decoder (not shown in FIG. 6) selects the row of cell 610 via line 618. Transistor 612 passes input voltage $V_1$ if SRAM cell 610 stores a logical 1, while transistor 614 passes input voltage $V_2$ if SRAM cell 610 stores a zero. Consequently, capacitor 620 is provided with the appropriate voltage based on the contents of SRAM cell 610. Capacitor 620 is in series with capacitor 622. Thus, capacitors 620 and 622 act as capacitive voltage divider. Each row in the column of SRAM cell 610 contributes to the total voltage corresponding to the voltage passed, the capacitance, $C_S$, of capacitor 620, and the capacitance, $C_L$, of capacitor 622. Each row contributes a corresponding voltage to the capacitor 622. The output voltage is measured across capacitor 622. In some embodiments, this voltage is passed to the corresponding aBit mixer 504 for the column. In some embodiments, capacitors 620 and 622 may be replaced by transistors to act as resistors, creating a resistive voltage divider instead of the capacitive voltage divider. Thus, using the configuration depicted in FIG. 6, CIM module 530 may perform a vector-matrix multiplication using data stored in SRAM cells 610.

Figure 7:
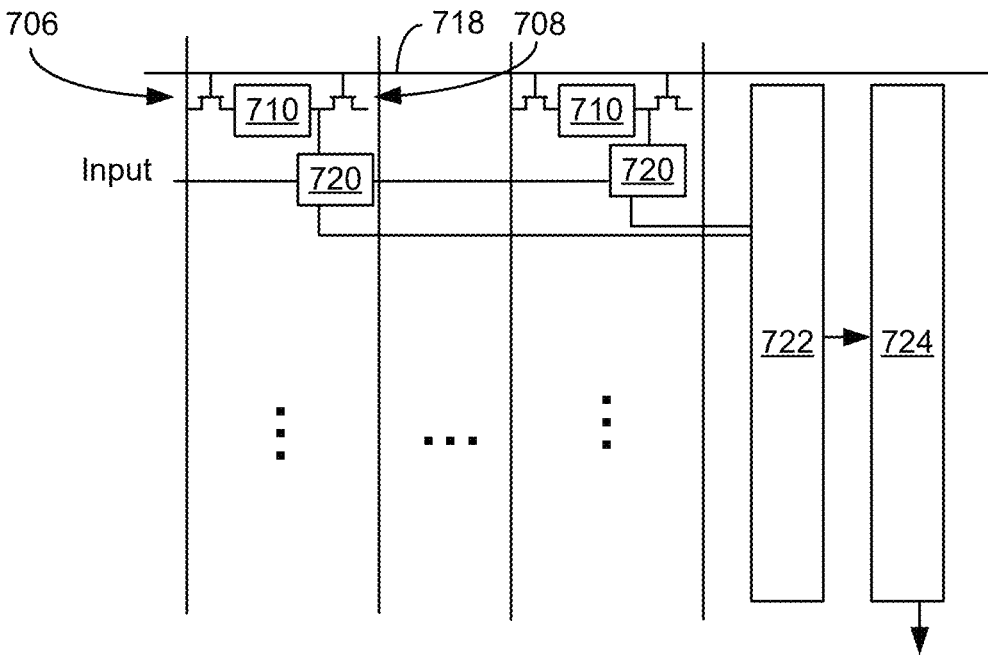
FIG. 7 depicts an embodiment of a portion of a compute-in-memory module usable in an AI accelerator. (SRAM)

FIG. 7 depicts an embodiment of a cell in one embodiment of a digital SRAM module usable for CIM module 530. For clarity, only two digital SRAM cells 710 are shown and labeled. However, multiple cells 710 are present and may be arranged in a rectangular array. Also labeled are corresponding transistors 706 and 708 for each cell, line 718, logic gates 720, adder tree 722 and digital mixer 724. Because the SRAM module shown in FIG. 7 is digital, DACs 502, aBit mixers 504, and ADCs 506 may be omitted from compute engine 500 depicted in FIG. 5.

In operation, a row including digital SRAM cell 710 is enabled by address decoder 570 (not shown in FIG. 7) using line 718. Transistors 706 and 708 are enabled, allowing the data stored in digital SRAM cell 710 to be provided to logic gates 720. Logic gates 720 combine the data stored in digital SRAM cell 710 with the input vector. Thus, the binary weights stored in digital SRAM cells 710 are combined with the binary inputs. The output of logic gates 720 are accumulated in adder tree 722 and combined by digital mixer 724. Thus, using the configuration depicted in FIG. 7, CIM module 530 may perform a vector-matrix multiplication using data stored in digital SRAM cells 710.

Referring back to FIG. 5, CIM module 530 thus stores weights corresponding to a matrix in its cells and is configured to perform a vector-matrix multiplication of the matrix with an input vector. In some embodiments, compute engine 500 stores positive weights in CIM module 530. However, the use of both positive and negative weights may be desired for some models and/or some applications. In such cases, bipolar weights (e.g. having range-S through +S) are mapped to a positive range (e.g. 0 through S). For example, a matrix of bipolar weights, W, may be mapped to a positive weight matrix $W_p$ such that: $Wx=(W_p-SJ/2)(2x)=5W_px-S\Sigma_ix_i$, where J is a matrix of all ones having the same size as W and S is the maximum value of the weight (e.g. $2^{N-1}-1$ for an N-bit weight). For simplicity, compute engine 500 is generally discussed in the context of CIM module 530 being an analog SRAM CIM module analogous to that depicted in FIG. 6.

Input cache 550 receives an input vector for which a vector-matrix multiplication is desired to be performed. In some embodiments, the input vector is provided to input cache by a GP processor, such as GP processor 110. The input vector may be read from a memory, from a cache or register in the processor, or obtained in another manner. Digital-to-analog converter (DAC) 502 converts a digital input vector to analog in order for CIM module 530 to operate on the vector. Although shown as connected to only some portions of CIM module 530, DAC 502 may be connected to all of the cells of CIM module 530. Alternatively, multiple DACs 502 may be used to connect to all cells of CIM module 530. Address decoder 570 includes address circuitry configured to selectively couple vector adder 544 and write circuitry 542 with each cell of CIM module 530. Address decoder 570 selects the cells in CIM module 530. For example, address decoder 570 may select individual cells, rows, or columns to be updated, undergo a vector-matrix multiplication, or output the results. In some embodiments, aBit mixer 504 combines the results from CIM module 530. Use of aBit mixer 504 may save on ADCs 506 and allows access to analog output voltages.

ADC(s) 506 convert the analog resultant of the vector-matrix multiplication to digital form. Output cache 560 receives the result of the vector-matrix multiplication and outputs the result from compute engine 500. Thus, a vector-matrix multiplication may be performed using CIM module 530.

LU module 540 includes write circuitry 542 and vector adder 544. In some embodiments, LU module 540 includes weight update calculator 546. In other embodiments, weight update calculator 546 may be a separate component and/or may not reside within compute engine 500. Weigh update calculator 546 is used to determine how to update to the weights stored in CIM module 530. In some embodiments, the updates are determined sequentially based upon target outputs for the learning system of which compute engine 500 is a part. In some embodiments, the weight update provided may be sign-based (e.g. increments for a positive sign in the gradient of the loss function and decrements for a negative sign in the gradient of the loss function). In some embodiments, the weight update may be ternary (e.g. increments for a positive sign in the gradient of the loss function, decrements for a negative sign in the gradient of the loss function, and leaves the weight unchanged for a zero gradient of the loss function). Other types of weight updates may be possible. In some embodiments, weight update calculator 546 provides an update signal indicating how each weight is to be updated. The weight stored in a cell of CIM module 530 is sensed and is increased, decreased, or left unchanged based on the update signal. In particular, the weight update may be provided to vector adder 544, which also reads the weight of a cell in CIM module 530. More specifically, adder 544 is configured to be selectively coupled with each cell of CIM module by address decoder 570. Vector adder 544 receives a weight update and adds the weight update with a weight for each cell. Thus, the sum of the weight update and the weight is determined. The resulting sum (i.e. the updated weight) is provided to write circuitry 542. Write circuitry 542 is coupled with vector adder 544 and the cells of CIM module 530. Write circuitry 542 writes the sum of the weight and the weight update to each cell. In some embodiments, LU module 540 further includes a local batched weight update calculator (not shown in FIG. 5) coupled with vector adder 544. Such a batched weight update calculator is configured to determine the weight update.

Compute engine 500 may also include control unit 545. Control unit 545 generates the control signals depending on the operation mode of compute engine 500. Control unit 545 is configured to provide control signals to CIM hardware module 530 and LU module 549. Some of the control signals correspond to an inference mode. Some of the control signals correspond to a training, or weight update mode. In some embodiments, the mode is controlled by a control processor (not shown in FIG. 5, but analogous to processor 110) that generates control signals based on the Instruction Set Architecture (ISA).

In inference mode, the input data is multiplied by the stored weights and output is obtained after ADC 506. This mode may include many steps. For example, if capacitors arranged in a voltage divider are used to provide the output (e.g. in FIG. 6), the capacitors (or other storage elements) may be reset. For example, capacitors are rest to either zero or certain precharge value depending on the functionality of the capacitor. Capacitive voltage divider operation is enabled to provide the output of the vector-matrix-multiplication. aBit mixer 504 is enabled. ADC(s) 506 are also enabled. Data are stored in output cache 560 to be passed to the compute engine or other desired location(s). This process may be repeated for the entire vector multiplication. In weight update mode, the weight update signals may be generated sequentially by weight update calculator 546. In parallel, cells in a row of CIM module 530 are read row by row and passed to adder 544 for the corresponding weight update.

Using compute engine 500, efficiency and performance of a learning network may be improved. CIM module 530 may dramatically reduce the time to perform the vector-matrix multiplication. Thus, performing inference(s) using compute engine 500 may require less time and power. This may improve efficiency of training and use of the model. LU module 540 uses components 542, 544, and 546 to perform local updates to the weights stored in the cells of CIM module 530. This may reduce the data movement that may otherwise be required for weight updates. Consequently, the time taken for training may be dramatically reduced. Efficiency and performance of a learning network provided using compute engine 500 may be increased.

Figure 8:
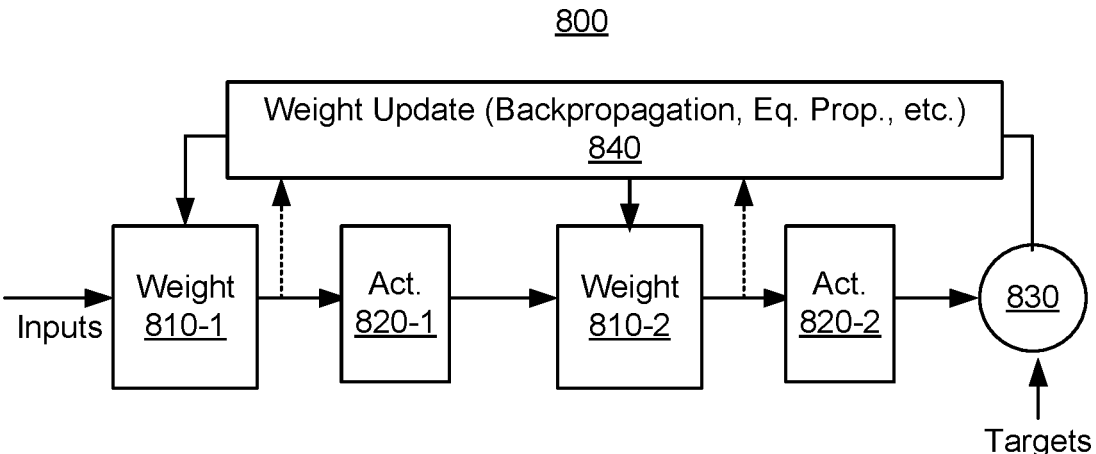
FIG. 8 depicts an embodiment of the data flow in a learning network.

For example, FIG. 8 depicts an embodiment of data flow in learning network 800 that can be implemented using compute tile 100, 200, and/or 300 and/or compute engine(s) 400 and/or 500. Learning network 800 includes weight layers 810-1 and 810-2 (collectively or generically 810) and activation layers 820-1 and 820-2 (collectively or generically 820). For training, loss function calculator 830 as well as weight update block 840 are shown. Weight update block 840 might utilize techniques including but not limited to back propagation, equilibrium propagation, feedback alignment and/or some other technique (or combination thereof). In operation, an input vector is provided to weight layer 810-1. A first weighted output is provided from weight layer 810-1 to activation layer 820-1. Activation layer 820-1 applies a first activation function to the first weighted output and provides a first activated output to weight layer 810-2. A second weighted output is provided from weight layer 810-2 to activation layer 820-2. Activation layer 820-2 applies a second activation function to the second weighted output. The output is provided to loss calculator 830. Using weight update technique(s) 840, the weights in weight layer(s) 810 are updated. This continues until the desired accuracy is achieved.

Compute tile(s) 100, 200, and/or 300 and compute engine(s) 120, 220, 320, 400, and/or 500 may be used to accelerate the processes of learning network 800. For simplicity, it is assumed that compute engine 500 is used in compute tile 300. Further, weight layers 810 are assumed to be storable within a single CIM module 530. Nothing prevents weight layers 810 from being extended across multiple CIM modules 530. In the data flow described above for learning network 800, an input vector is provided to a compute engine 320-1 from GP processor 310. More specifically, the input vector is provided to CIM module 530 (e.g. via input cache 550 and DAC(s) 502). Initial values of weights are stored in, for example, SRAM cells (e.g. 610 or 710) of CIM module 530. A vector matrix multiplication is performed by CIM module 530 and provided to output cache 560 (e.g. also using aBit mixers 504 and ADC(s) 506). Thus, the processes of weight layer 810-1 may be performed. Activation layer 820-1 may be performed using a GP processor 310. The output of activation layer 820-1 (e.g. from GP processor 310) is provided to the next weight layer 810-2. Initial weights for weight layer 810-2 may be in another compute engine 330-2/CIM module 530. In another embodiment, new weights corresponding to weight layer 810-2 may be stored in the same hardware CIM module 530 of the same compute engine 330-1. A vector matrix multiplication is performed by CIM module 530 and provided to output cache 560 (e.g. also using aBit mixers 504 and ADC(s) 506). Activation layer 820-2 may be performed using a processor such as GP processor 310. The output of activation layer 820-2 is used to determine the loss function via hardware or GP processor 310. The loss function may be used to determine the weight updates by GP processor 310, weight update calculator 546/800. Using LU modules 540 and the weights in CIM modules 530, weight layers 810 may be updated. Thus, learning network 800 may be realized using compute tile 100, 200, and/or 300 and/or compute engine 500. The benefits thereof may, therefore, be obtained.

Figure 9A:
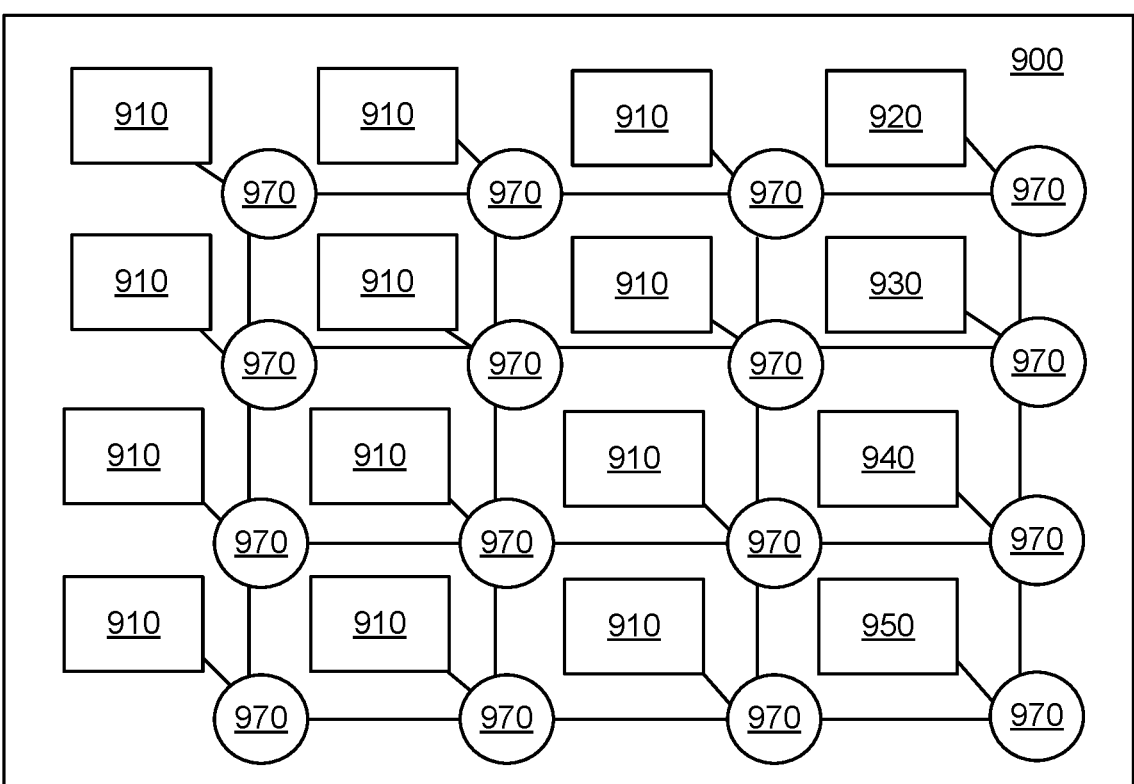
FIGS. 9A-9C depict an embodiment of an architecture including compute engines and usable in an AI accelerator.
Figure 9B:
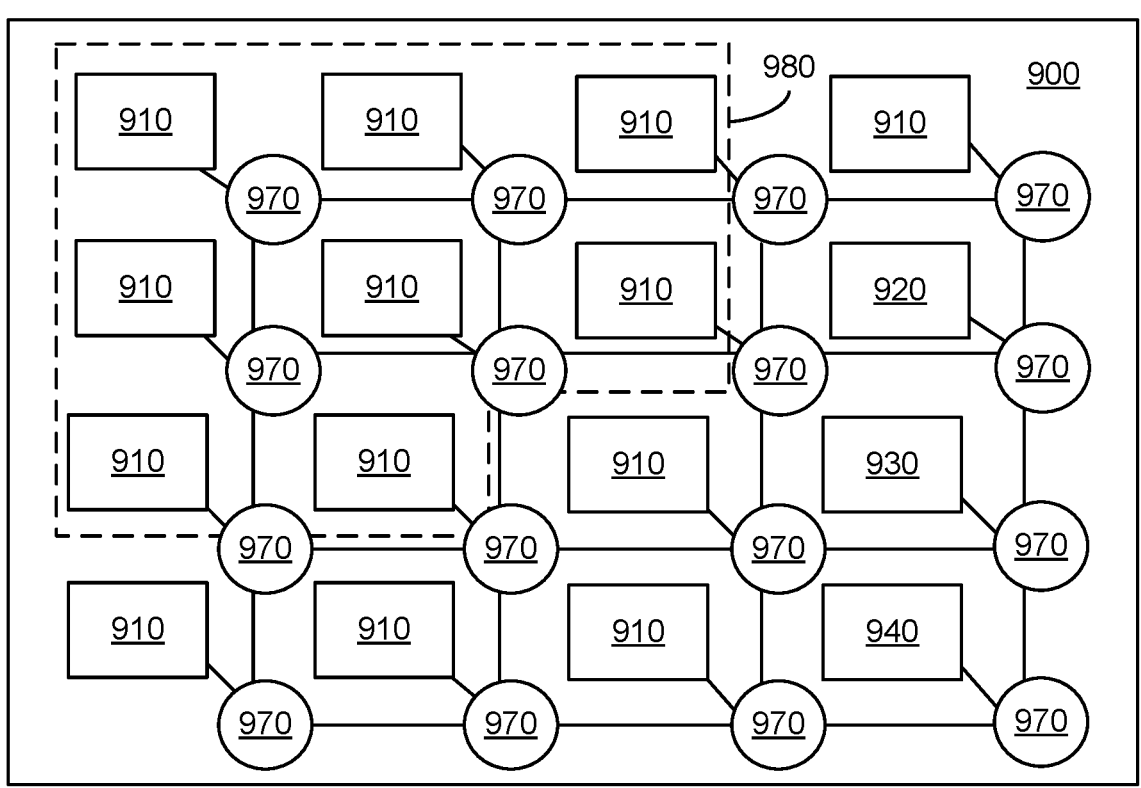
Figure 9C:
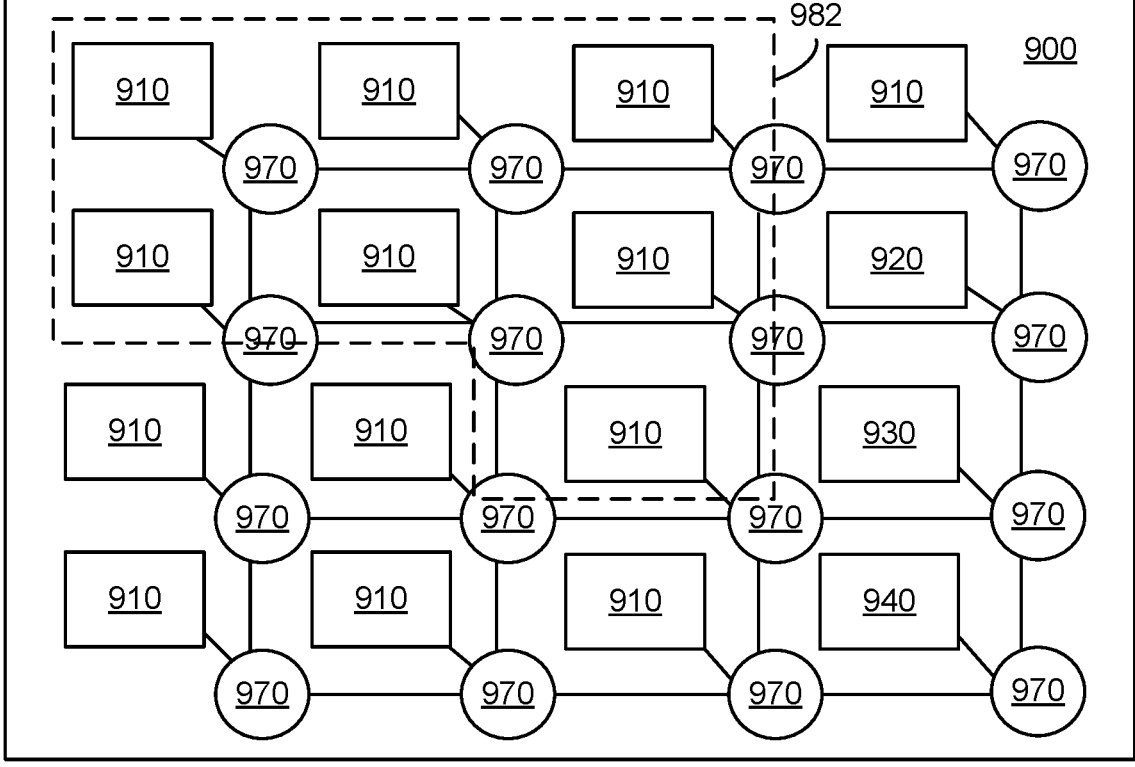

Compute engines 120, 220, 320, 400 and/or 500 may be combined in a variety of architectures. For example, FIGS. 9A-9C depict an embodiment of an architecture including multiple compute tiles 910, each of which is analogous to compute tile(s) 100, 200, and/or 300. An AI accelerator may include or be architecture 900. In some embodiments, architecture 900 may be considered a system on a chip (SoC) or a network on a chip (NoC). SoC 900 includes compute tiles 910, a DDR controller 920, PCIe or other analogous module 930, peripheral I/O module 940, management control processor (MCP) 950, and routers/mesh interconnects 970. Other and/or different components may be included. DDR controller 920 allows for DRAM (not shown) to be coupled with SoC 900. PCIe module 930 allows for connectivity to a host (not shown). Peripheral I/O module 940 may be merged with MCP 950 in some embodiments. MCP 950 may perform housekeeping and other management functions for SoC 900. Via routers/mesh interconnects 970 and modules such as mesh stops, such as mesh stops 280 and/or 380, tiles 910 may be interconnected.

In SoC 900, each tile 910 is an independent compute unit which has its own local memory analogous to SRAM 130, 230, and/or 330. Tiles 910 are interconnected by mesh interconnects. In some embodiments, this allows any tile 910 to access the memory of any other tile 910. Tiles 910 each have memory that is fully globally addressable. In some embodiments, a tile 910 may interact with any other tile 910 of SoC 900. Thus, tiles 920 may be considered to be tightly-coupled, independent compute and memory blocks with globally addressable memory that enable a compiler (not shown in FIGS. 9A-9C) to create custom super tiles. Super tiles can be formed by some combination of two or more tiles 910. For example, FIG. 9B depicts SoC 900 in which super tile 980 has been formed from eight tiles 910. Similarly, FIG. 9C depicts SoC 900 in which super tile 982 has been formed from seven tiles 910. Other supertiles may be formed. Super tiles may be used to create custom pipelines for scheduling computational graphs for execution using SoC 900 and/or for other purposes. In some embodiments, for example, an arbitrary computational graph can be mapped to SoC 900 via super tiles. The mesh interconnection of tiles 900 in SoC may reflects the custom traffic patterns observed on SoC 900. The custom traffic patterns might require support for multicast, broadcast for various operators (e.g. BatchNorm). In other embodiments, other and/or additional features may be supported based upon the traffic patterns.

Using SoC 900 efficiency and performance of a learning network may be improved. In addition to the benefits of the individual tiles 900, such as more efficient control and movement of data within a tile, SoC 900 may extend the benefits to larger systems. Through super tiles, SoC 900 may be tailored to the specific traffic patterns and applications with which SoC 900 is desired to be used. Consequently, efficiency and performance may be enhanced.

Figure 10:
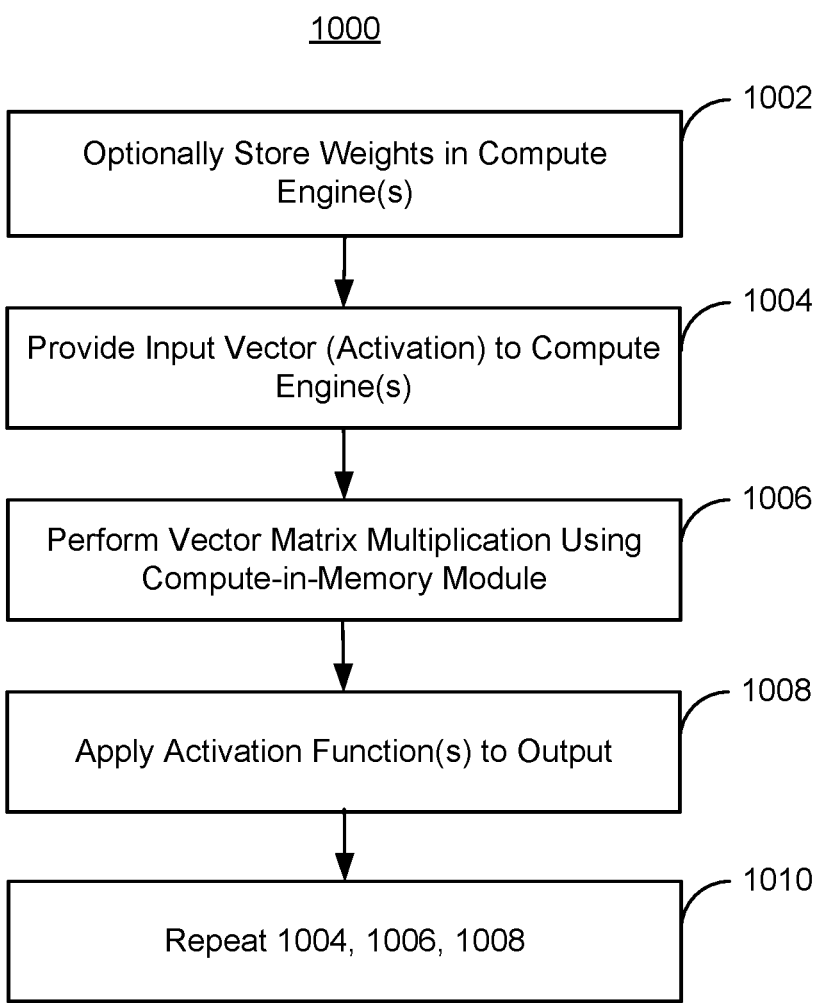
FIG. 10 is a flow chart depicting one embodiment of a method for using a compute engine usable in an AI accelerator for training.

FIG. 10 is a flow chart depicting one embodiment of method 1000 for using a compute engine usable in an AI accelerator for training. Method 1000 is described in the context of compute tile 300 and compute engine 500. However, method 1000 is usable with other compute tiles, such as compute tiles 200 and/or 300 and/or other compute engines, such as engine 400. Although particular processes are shown in an order, the processes may be performed in another order, including in parallel. Further, processes may have substeps.

Weights corresponding to a weight matrix may be stored in one or more compute engines of a compute tile, at 1002. In some embodiments, this occurs at a time that is distinct from the remainder of method 1000. In some embodiments, 1002 includes storing the weights in the CIM hardware module of the compute engine of the compute tile. An input vector is provided to the compute engine(s) of the compute tile, at 1004. In some embodiments, this is performed via the GP processor corresponding to the compute tile. The compute engine(s) perform a VMM between the input vector and the matrix, at 1006. In some embodiments, this is performed by the CIM hardware module. Thus, 1006 provides an output that is the weight matrix multiplied by the input vector. One or more activation functions are applied to the output, at 1008. In some embodiments, 1008 is performed by the GP processor for the compute tile. At 1010, 1004, 1006, and 1008 may be repeated for multiple inferences with the same or other compute engines (e.g. other weight matrices).

For example, weights may be stored in the compute engines 320 of compute tile 300, at 1002. For example, data may be stored in SRAM cells 610 of CIM hardware modules 530 of compute engine 500. During inference or training, an input vector is provided to compute engine(s) 320. For example, an input vector stored in memory 330 may be provided to GP processor 310, and from GP processor 310 to the appropriate compute engine(s) 320. GP processor may instruct compute engine(s) 320 to perform a VMM of the input vector and the weight matrix stored in compute engine(s) 320. Thus, at 1006, compute engine(s) 320 perform VMM in parallel. For example, compute engine 500 may use CIM hardware module 530 to perform a VMM. Also at 1006, the output of the VMM is provided to GP processor 310. Activation function(s) are applied to the output, at 1008. This may be performed by GP processor 310. In some embodiments, fixed function computing block 316 may be used in accomplishing 1008. The resultant of the activation function being applied to the output of compute engines 320 may be stored by GP processor 310 in memory 130. At 1008, these processes may be repeated. Thus, inferences may be improved. Further, training may be performed on-chip using the resultants of method 1000 and, for example, LU modules 440 and/or 540.

Using method 1000, the benefits of compute tiles 100, 200, and/or 300 may be achieved. For example, efficiency and performance of learning may be improved. The time to perform the VMMs may be reduced and the movement of data made more efficient. This may improve efficiency of training and use of the model. Efficiency and performance of a learning network provided using method 1000 may be increased.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A compute tile, comprising:
a plurality of compute engines, each of the plurality of compute engines including a compute-in-memory (CIM) hardware module, the CIM hardware module including fully addressable memory cells and hardware compute logic coupled with the fully addressable memory cells, the CIM hardware module storing a plurality of weights corresponding to a matrix in the fully addressable memory cells, and the hardware compute logic being configured to perform a vector-matrix multiplication (VMM) for the matrix and including a plurality of logic gates for the fully addressable memory cells, a logic gate of the plurality of logic gates having a first input from a corresponding memory cell of the fully addressable memory cells, a second input for a bit of an input vector, and an output providing a multiplication of a memory bit stored in the corresponding memory cell and the bit of the input vector, wherein each of the plurality of compute engines includes a local update module coupled with the CIM hardware module and configured to locally update at least a portion of the plurality of weights, wherein the local update module resides on the same integrated circuit as the CIM module, wherein the local update module is configured to receive a weight of the plurality of weights from a memory cell of the fully addressable memory cells in the CIM hardware module, locally add a weight update to the weight to provide an updated weight, and write the updated weight to the memory cell; and
a general-purpose (GP) processor coupled with the plurality of compute engines and configured to provide control instructions and data to the plurality of compute engines, the GP processor being a reduced instruction set computer (RISC) processor;
wherein each of the plurality of compute engines is individually coupled with the GP processor such that each of the plurality of compute engines is configured to store data from the GP processor based on a load instruction from the GP processor, perform the VMM, and store output to the GP processor based on a store instruction from the GP processor, wherein at least a first portion of the VMM for each of the plurality of compute engines is performable in parallel with at least a second portion of the VMM for another of the plurality of compute engines, wherein an activation function is applied to an output of at least one compute engine of the plurality of compute engines by the GP processor, wherein the activation function corresponds to a nonlinear operation,
wherein the CIM hardware module of at least one compute engine of the plurality of compute engines is repurposed as a storage memory based on a utilization determination of the at least one compute engine falls below a predefined threshold.

2. The compute tile of claim 1, wherein the GP processor is coupled with the plurality of compute engines via a streaming port and a control port, the control port configured to provide the plurality of compute engines with the control instructions and the streaming port being configured to exchange data between the GP processor and each of the plurality of compute engines.

3. The compute tile of claim 1, wherein the plurality of compute engines is configured to perform linear operations.

4. The compute tile of claim 1, further comprising:
local memory coupled with the GP processor.

5. The compute tile of claim 4, further comprising:
a direct memory access (DMA) unit coupled with the local memory and the GP processor, the DMA unit being configured for data transfers to and from the compute tile.

6. The compute tile of claim 1, wherein the GP processor further includes: a single instruction multiple data arithmetic logic unit.

7. The compute tile of claim 1, wherein the compute tile is included in a plurality of compute tiles.

8. A system, comprising:
a plurality of compute tiles, each of the plurality of compute tiles including a plurality of compute engines and a general-purpose (GP) processor coupled with the plurality of compute engines, each of the plurality of compute engines including a compute-in-memory (CIM) hardware module, the CIM hardware module including fully addressable memory cells and hardware compute logic coupled with the fully addressable memory cells, the CIM hardware module storing a plurality of weights corresponding to a matrix in the fully addressable memory cells, and the hardware compute logic being configured to perform a vector-matrix multiplication (VMM) for the matrix and including a plurality of logic gates for the fully addressable memory cells, a logic gate of the plurality of logic gates having a first input from a corresponding memory cell of the fully addressable memory cells, a second input for a bit of an input vector, and an output providing a multiplication of a memory bit stored in the corresponding memory cell and the bit of the input vector, the GP processor being configured to provide control instructions and data to the plurality of compute engines, the GP processor being a reduced instruction set computer (RISC) processor, wherein each of the plurality of compute engines includes a local update module coupled with the CIM hardware module and configured to locally update at least a portion of the plurality of weights, wherein the local update module resides on the same integrated circuit as the CIM module, wherein the local update module is configured to receive a weight of the plurality of weights from a memory cell of the fully addressable memory cells in the CIM hardware module, locally add a weight update to the weight to provide an updated weight, and write the updated weight to the memory cell;

wherein each of the plurality of compute engines is individual coupled with the GP processor such that each of the plurality of compute engines is configured to store data from the GP processor based on a load instruction from the GP processor, perform the VMM, and store output to the GP processor based on a store instruction from the GP processor, wherein at least a first portion of the VMM for each of the plurality of compute engines is performable in parallel with at least a second portion of the VMM for another of the plurality of compute engines, wherein an activation function is applied to an output of at least one compute engine of the plurality of compute engines by the GP processor, wherein the activation function corresponds to a nonlinear operation, wherein the CIM hardware module of at least one compute engine of the plurality of compute engines is repurposed as a storage memory based on a utilization determination of the at least one compute engine falls below a predefined threshold.

9. The system of claim 8, wherein the GP processor is coupled with the plurality of compute engines via a streaming port and a control port, the control port configured to provide the plurality of compute engines with the control instructions and the streaming port being configured to exchange data between the GP processor and each of the plurality of compute engines.

10. The system of claim 8, wherein the plurality of compute engines is configured to perform linear operations.

11. The system of claim 8, wherein at least one of the plurality of compute tiles further includes local memory coupled with the GP processor.

12. The system of claim 11, wherein the at least one of the plurality of compute tiles further includes:

at least one of a direct memory access (DMA) unit coupled with the local memory and the GP processor for the at least one of the plurality of compute tiles, the DMA unit being configured for data transfers to and from the compute tile or a data bus configured to transfer data to or from the local memory.

13. The system of claim 8, wherein the GP processor further includes: a single instruction multiple data arithmetic logic unit.

14. A method, comprising:

providing, to at least one compute engine of a plurality of compute engines, an input vector, the at least one compute engine storing a plurality of weights corresponding to a matrix, each of the plurality of compute engines including a compute-in-memory (CIM) hardware module, the CIM hardware module including fully addressable memory cells and hardware compute logic coupled with the fully addressable memory cells, the CIM hardware module of the at least one compute engine storing the plurality of weights in the fully addressable memory cells, and the hardware compute logic being configured to perform a vector-matrix multiplication (VMM) for the matrix and including a plurality of logic gates for the fully addressable memory cells, a logic gate of the plurality of logic gates having a first input from a corresponding memory cell of the fully addressable memory cells, a second input for a bit of the input vector, and an output providing a multiplication of a memory bit stored in the corresponding memory cell and the bit of the input vector, the at least one compute engine performing a VMM between the input vector and the matrix to provide an output, wherein each of the plurality of compute engines includes a local update module coupled with the CIM hardware module and configured to locally update at least a portion of the plurality of weights, wherein the local update module resides on the same integrated circuit as the CIM module, wherein the local update module is configured to receive a weight of the plurality of weights from a memory cell of the fully addressable memory cells in the CIM hardware module, locally add a weight update to the weight to provide an updated weight, and write the updated weight to the memory cell;

applying, by a general-purpose (GP) processor coupled with the plurality of compute engines, a function to the output, the GP processor being configured to provide control instructions and data to the plurality of compute engines, the GP processor being a reduced instruction set computer (RISC) processor;

wherein each of the plurality of compute engines is coupled with the GP processor such that each of the plurality of compute engines is configured to store data from the GP processor based on a load instruction from the GP processor, perform the VMM, and store output to the GP processor based on a store instruction from the GP processor, wherein at least a first portion of the VMM for each of the plurality of compute engines is performable in parallel with at least a second portion of the VMM for another of the plurality of compute engines, wherein an activation function is applied to an output of at least one compute engine of the plurality of compute engines by the GP processor, wherein the activation function corresponds to a nonlinear operation, wherein the CIM hardware module of at least one compute engine of the plurality of compute engines is repurposed as a storage memory based on a utilization determination of the at least one compute engine falls below a predefined threshold.

15. The method of claim 14, further comprising:

storing, in the at least one compute engine, the plurality of weights.

16. The method of claim 14, wherein the GP processor is coupled with the plurality of compute engines via a streaming port and a control port, the control port configured to provide the plurality of compute engines with the control instructions and the streaming port being configured to exchange data between the GP processor and each of the plurality of compute engines.

17. The method of claim 15, wherein the plurality of compute engines is configured to perform linear operations.

18. The compute tile of claim 1, further comprising:

at least one connector coupling the plurality of compute engines with the GP processor by at least one connector such that each of the plurality of compute engines receives data from and provides output to the GP processor through the at least one connector.

19. The compute tile of claim 1, wherein each of the plurality of compute engines is coupled with the GP processor such that data is received by each of the plurality of compute engines only through the GP processor.

20. The compute tile of claim 1, wherein the plurality of weights stored in the CIM hardware module comprises at least one duplicated weight.

* * * * *